(12) United States Patent
Kwan et al.

(10) Patent No.: US 11,748,686 B1
(45) Date of Patent: Sep. 5, 2023

(54) AUTOMATED ONBOARDING SERVICE

(71) Applicant: Amazon Technologies, Inc., Seattle, WA (US)

(72) Inventors: Yuk Lun Patrick Kwan, Bellevue, WA (US); Revanth Pathuri, Redmond, WA (US); Muen Chen, Seattle, WA (US); Gary Rittinger, Kent, WA (US); Arnaud Jean Aime Mauvais, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 17/364,467

(22) Filed: Jun. 30, 2021

(51) Int. Cl.
| | | |
|---|---|---|
| *G06F 15/16* | (2006.01) |
| *G06Q 10/067* | (2023.01) |
| *G06Q 10/10* | (2023.01) |
| *G06Q 10/0633* | (2023.01) |
| *G06F 21/60* | (2013.01) |
| *G06F 11/36* | (2006.01) |
| *G06F 9/54* | (2006.01) |
| *G06Q 20/12* | (2012.01) |

(52) U.S. Cl.
CPC .......... *G06Q 10/067* (2013.01); *G06F 9/541* (2013.01); *G06F 11/3684* (2013.01); *G06F 11/3688* (2013.01); *G06F 21/604* (2013.01); *G06Q 10/0633* (2013.01); *G06Q 10/10* (2013.01); *G06Q 20/127* (2013.01)

(58) Field of Classification Search
CPC ... G06Q 10/067; G06F 9/541; G06F 11/3684; G06F 11/3688; G06F 21/604
USPC .................................................. 709/201, 203
See application file for complete search history.

(56) References Cited

U.S. PATENT DOCUMENTS

| | | | | |
|---|---|---|---|---|
| 11,102,081 | B1 * | 8/2021 | Tiwari .................... H04L 41/14 |
| 2008/0184206 | A1 * | 7/2008 | Vikutan .............. G06F 11/3688 |
| | | | | 717/127 |
| 2013/0152047 | A1 * | 6/2013 | Moorthi .............. G06F 11/3688 |
| | | | | 717/124 |
| 2017/0371937 | A1 * | 12/2017 | Shah ......................... G06F 8/71 |
| 2021/0182131 | A1 * | 6/2021 | Reuzel ................ G06F 16/9566 |
| 2023/0093370 | A1 * | 3/2023 | Battaglia ................... G06F 8/65 |

\* cited by examiner

*Primary Examiner* — Liang Che A Wang
(74) *Attorney, Agent, or Firm* — Lee & Hayes, P.C.

(57) ABSTRACT

A system can be configured to receive an onboarding request for a service and an API associated with the service. An API configuration defining access permissions, API call structures, and available operations can be determined for the service by an onboarding service. The API configuration can be utilized by the onboarding service to register the API with a proxy server such that incoming API calls are redirected to an access endpoint associated with the service. The proxy server enables the service and the API to be updated via the onboarding requests as service modification and API modification can be submitted, validated, and integrated into a service environment due to the proxy server decoupling the API from the service.

19 Claims, 9 Drawing Sheets

AUTOMATED ONBOARDING SERVICE

BACKGROUND

Presently, application program interfaces (APIs) that are associated with various services and operations provided by a service environment are implemented and updated via manual manipulation of the APIs and the services. However, as the service environment and other related service environments grow, the interdependencies of APIs expand, and the operations of the services become more interconnected, the process of integrating updates to the service environment become increasingly taxing on developer time. Additionally, the existence of multiple service environment utilizing different versions of the APIs and the services further compounds the issue. Accordingly, increasingly complex APIs and service environments become increasingly difficult and increasingly costly to manually manage in the current implementation due to the number of potential errors requiring testing once an API update or a service modification is introduced to the service environment. Further, the interdependency of APIs obfuscates the ultimate consequences of an update or a modification such that service environment downtime is incurred due to dependencies that may not be effectively identified through standard testing operations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
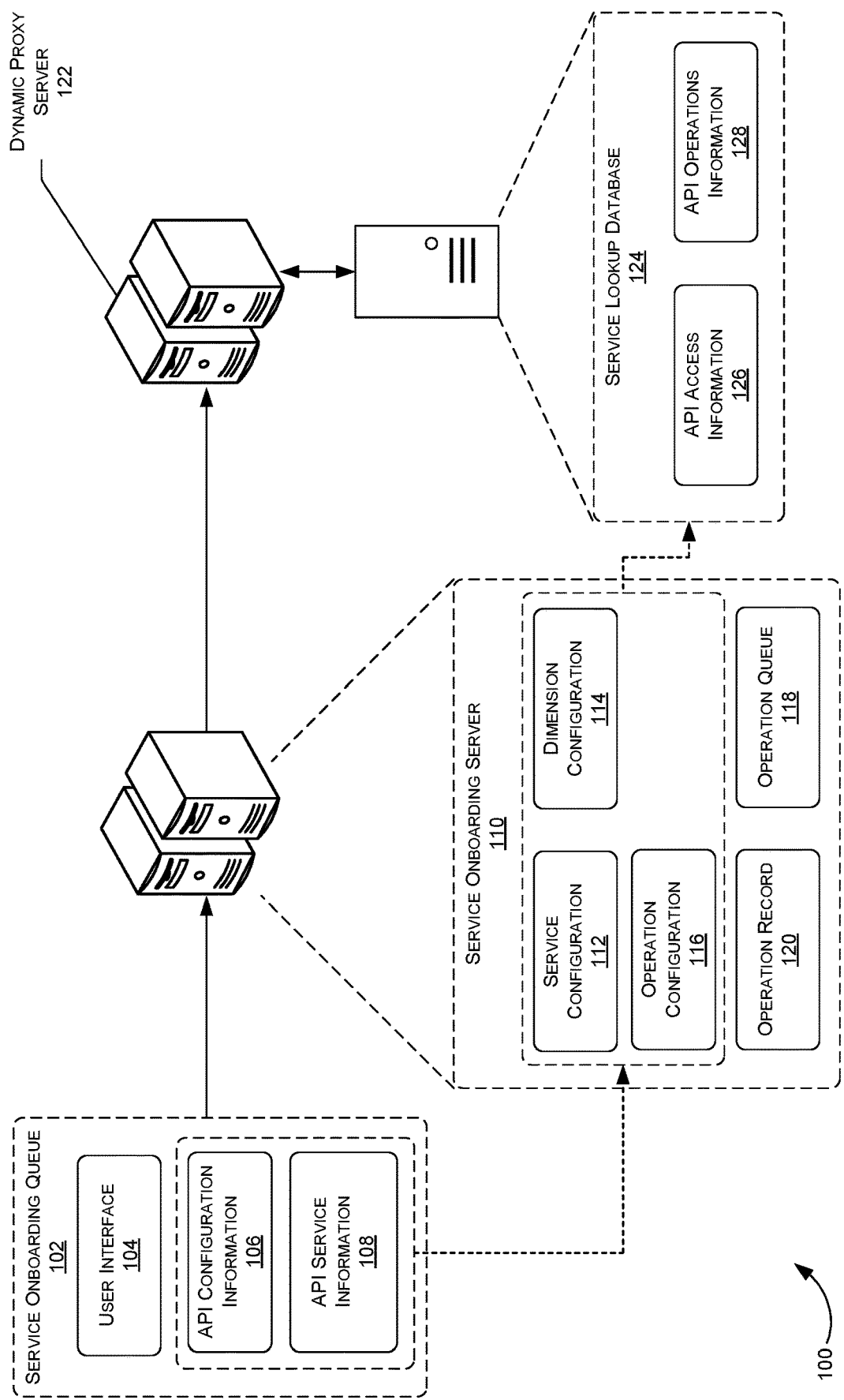
FIG. 1 illustrates a service onboarding system that is configured to receive a user request and integrate a service associated with the user request into one or more service environments.

Described herein are techniques for establishing an onboarding queue that enables an application program interface (API) to be validated and integrated into one or more service environments such that users, entities, and other APIs within the one or more service environments can access a service provided via the API. In particular, the onboarding queue can receive API configuration information and API service information that is provided to an onboarding server such that the onboarding server generates an API configuration. The API configuration can enable the API to be integrated into the one or more service environments for validation and activation. Additionally, the onboarding queue can be configured to receive the API configuration information and the API service information associated with the API via user interface and/or an API package. The onboarding server can receive the API configuration information and the API service information and determine a service configuration, a dimension configuration, and an operation configuration that establish one or more API calls that are registered with a dynamic proxy server and enable the API to be accessed via the dynamic proxy server. As noted above, the API configuration information and the API service information can be provided via a user interface that such that the onboarding server receives the service configuration, the dimension configuration, and the operation configuration for registration with the proxy server. Alternatively, or in addition, the onboarding server can receive a data file or other data package that contains the API configuration information and the API service information formatted such that the onboarding server can determine the service configuration, the dimension configuration, and the operation configuration. Accordingly, the onboarding queue can enable the API to be submitted for integration into the dynamic proxy server and validated via end-to-end testing within the one or more service environments such that functionality of the API is verified while interacting/interfacing with one or more existing APIs of the one or more service environments.

In some examples, the API can be configured to provide access to the service and the operations of the service to users, entities, and other APIs associated with the one or more service environments. In particular, the API can be configured such that API calls to the service provide an trigger for an operation of the one or more operations, one or more input variable(s) associated with the operation, and one or more output variable(s) that are generated by the operation and returned via an API call response. The operation configuration can be configured to establish connections between the API calls of the server and the one or more operations that comprise the service, wherein the API call can be directed to the service and the operation to cause the service environments to execute one or more actions that modify and/or utilize the one or more input variables received via the API call and generate the one or more output variables returned via the API call response. Additionally, the operation configuration can establish dependencies of the operation via one or more internal API calls to one or more additional APIs available within the one or more service environments. Similar to the operation described above, the one or more internal API calls can submit a first variable (or variables) and receive a second variable that is further utilized by the operation. Further, the operation can be configured to transmit the one or more output variables to the user device, to one or more endpoints associated with the API, and/or to one or more databases associated with the service environment/entity associated with the service environment via the API call response.

For example, the API can be a Profile Management service that includes a profile creation operation that is called by a create user profile request, receives user information submitted by a user via a user interface, and analyzes the user information to determine a username, a password, user preferences, and other indications submitted by the user. Additionally, the profile creation operation can then cause a user profile to be created and populated with the user information. Further, the profile creation function can transmit the user profile generated by the profile creation function to a user profile database and cause the user profile database to store the user information within the user profile. Accordingly, the operation configuration can be configured to describe a call format for the create user profile request (e.g., the API call), define internal API calls transmitted by the profile creation function receives, identify data sources accessed by the profile creation function, and generate the API call response that causes the user profile database to store the user profile.

In some examples, the API can include the service comprised of the one or more operations accessed via the one or more API calls and the framework that enables the operations to execute within the one or more service environments based on the receipt of the API call. In particular, the service configuration can be configured to identify an access endpoint for the service within the one or more service environments. Additionally, the service configuration can describe an API call structure for the service and the one or more operations that includes definition of the one or more input variables within the API call for the one or more operations of the service. Further, the service configuration can describe the structure of output variables and information transmitted by the service via API call response that is generated by the one or more operations. Accordingly, the service configuration can identify the structures of API calls and API call responses that are transmitted to and from an endpoint associated with the service via the API.

In some examples, the API can include API permissions that are associated with the service, the one or more operations, and the one or more service environments. In particular, the dimension configuration can be configured to describe one or more service environments where the service can be accessed, one or more categories of users permitted to generate the API calls to and from the API, and one or more additional APIs that can be called by the one or more operations of the service. Additionally, the dimension configuration can be configured to enable the API to be registered with the dynamic proxy server that is configured to decouple the service configuration of the API from user and entity facing portals such that modifications to the API can be registered independent of the service and modification to the service can be registered independent of the API. Accordingly, the dimension configuration can describe capabilities of one or more users, the API, and the one or more additional APIs to interact with the service and the operations. Further, the dimension configuration can describe the interactions between API calls for the service and the operations triggered by the API calls.

As noted above, one or more modifications to the API and/or the service can be submitted to the onboarding queue in via modified API configuration information and/or modified API service information that is submitted via a user interface and/or an API data package. Alternatively, or in addition, a new API can be submitted to the onboarding queue via generated API configuration information and generated API service information that is unassociated with the one or more APIs that exist within the one or more service environments. Independent of whether the API configuration information is modified or generated and/or whether the API service information is modified or generated, the API configuration information and the API service information can be received via the onboarding queue at a service onboarding service and trigger the service onboarding service to parse the API configuration and extract the API configuration (e.g., operation configuration, dimension configuration, service configuration, etc.) that can be utilized to register the API and the API calls with the dynamic proxy server and the one or more service environments. Additionally, the API can be submitted to the onboarding queue via a user interface that prompts a user to submit the API configuration via a configuration package that enables the service onboarding server to sync the API configuration, including any modified and/or generated information, with existing endpoints, existing APIs, and other features of the one or more service environments.

Currently, integration of APIs into existing service environment utilizes manual teams to receive the APIs and API configurations and describe the APIs as entities within the existing service environments. Integration of the APIs into the existing service environment generally requires significant manual effort and developer hours to generate the API configuration within the appropriate environment, set user and API permissions, establish call structures between the API and other APIs, and validate the API. In particular, validation of the API to ensure that the dependencies of and/or on the API function properly within the existing service environments can require significant effort, cost, computing resources, etc. due to interdependencies and interactions between individual APIs. Additionally, individual integration of the API and modifications to the API may be performed manually. However, as the number of registered APIs within the existing service environments increases and the number of interdependencies between APIs increases, the resources of administrators to manually integrate and validate the APIs are quickly consumed and exceeded by the increasingly complex scheme of APIs within the existing service environments. Accordingly, a substantially and/or partially automated onboarding server for receiving generated APIs and modified APIs can enable the APIs to be integrated into the existing service environment without unnecessarily consuming administrator resources.

FIG. 1 illustrates a service onboarding system that is configured to receive a user request and integrate a service associated with the user request into one or more service environments. In particular, FIG. 1 illustrates a system 100 that is configured to populate a service onboarding queue 102 with information received via a user interface 104. More specifically, the service onboarding queue 102 can be populated with API configuration information 106 and API service information 108 based at least on a user request submitted via the user interface 104. Additionally, a service onboarding server 110 can be configured to receive the user request and utilize the API configuration information 106 and the API service information 108 to generate a service configuration 112, a dimension configuration 114, an operation configuration 116, an operation queue 118, and an operation record 120. Further, the service onboarding server 110 can be configured to register an API associated with the user request such that the API is accessible via a dynamic proxy server 122 and a service lookup database 124. Accordingly, the service modification server 110 can be configured to register the API with the dynamic proxy server 122 and store API access information 126 and a list of API operations 128 within the service lookup database 124.

In some examples, the service onboarding queue 102 can be configured to receive user requests that indicate an API is to be integrated into one or more service environments. In particular, the service onboarding queue 102 can be associated with the user interface 104 that enables a user and/or an administrator to submit a user request for the API to be integrated into the one or more service environments that are accessed via the dynamic proxy server 122. Additionally, the service onboarding queue 102 can be configured to receive, via the user interface, the API configuration information 106 and the API service information 108. The API configuration information 106 and the API service information 108 can be associated with the user request and stored by the service onboarding queue 102 until the service onboarding server 110 extracts the user request from the service onboarding queue 102. Further, the user interface 104 can be a front-end user interface that is associated with the service onboarding server 110, configured to provide the API configuration information 106 and the API service information 108 into the user request, and configured to submit the user request to the service onboarding queue 102. Alternatively, or in addition, the user request can be generated via the user interface 104 on a separate user device and include an API package that includes the API configuration information 106 and the API service information 108 for the API. The API package can be transmitted to the service onboarding server 110 for submission to the service onboarding queue 102 and analysis by the service onboarding server 110. Accordingly, the API configuration information 106 and the API service information 108 can be submitted to the service onboarding server 110 to register the API for the one or more service environments.

In some examples, the user interface 104 can be a service onboarding portal that enables the user and/or the administrator to submit the API configuration information 106 and the API service information 108 to the service onboarding queue 102. In particular, an orchestration controller associated with the service onboarding server 110 can receive the API configuration information 106 and the API service information 108 and access the API in order to generate an API configuration for the dynamic proxy server 122 and registration of the API to the one or more service environments identified within the API configuration information 106. Additionally, the orchestration controller of the service onboarding service 110 can invoke the service via the API service information 108 to identify input variables, output variables, request formats, and other service information associated with the API. Accordingly, the API configuration information 106 and the API service information 108 enable the service onboarding server 110 to generate the API configuration that describes access to the service via the API for the dynamic proxy server 122.

In some examples, the user interface 104 can be configured to enable the API configuration to be submitted to the service onboarding server 110 based on the API configuration information 106 and the API service information 108. In particular, the API configuration information 106 can describe an API call for the service that is associated with a call structure and enables one or more input variables to be passed to an operation of the service. Additionally, the API configuration information 106 can describe the call structure associated with a plurality of calls that comprise the API, wherein the plurality of calls can enable users and other APIs to access the operations of the service. As noted above, the API call can be a component of the API that includes a command that triggers the dynamic proxy server 122 and/or a service environment to initiate the service and/or the operation(s) of the API. More specifically, the API call can include the command that causes the service environment to access the API, provide the one or more input variables to the operation identified by the API call, and cause the operation to be executed based on the one or more input variables. Accordingly, the API configuration information 106 can be configured to enable the dynamic proxy server 122 and/or other servers to access the API and trigger the activation of the service via the API.

In some examples, the API service information 108 can be submitted via the user interface 104 to the service onboarding server 110 to describe the API and the control functions of the API that can be registered with the dynamic proxy server 122. In particular, the API service information 108 can identify one or more service environments that the API can be registered with, one or more categories of users that can transmit the one or more calls of the API to trigger the operations of the API, and one or more additional APIs that can transmit the one or more calls of the API. Accordingly, the API service information 108 can be configured to identify access rights and registration information that enables users and additional APIs to trigger the operations associated with the API.

In some examples, the service onboarding server 110 can generate the service configuration 112, the dimension configuration 114, the operation configuration 116, the operation queue 118, and the operation record 120. As noted above, the operation configuration 116 can be configured to describe available interactions with an operation of the service that is accessed by one or more API calls and the one or more input variables that are submitted to the operation via the one or more API calls. For example, the operation can be configured to retrieve an invoice for an Invoice Manager service based at least on an account ID, an invoice ID, and/or other identifier. The service onboarding server 110 can generate, based at least on the API service information 108, the operation configuration 116 to include a get invoice by invoice ID operation and/or a get invoice by account ID operation. Further, the operation configuration 116 can indicate that the get invoice by invoice ID operation is configured such that a first API call submits one or more first input variables that include an Invoice ID input and/or a request info input to the get invoice by invoice operation. The operation can be activated by the first API call and generate a first API call response that includes one or more first output variables, such as the Invoice ID input, a billed Account ID output, a billed entity output, and other information generated by the get invoice by invoice ID operation associated with the first API call. Similarly, the get invoice by account ID operation can be activated by a second API, can be configured to receive one or more second input variables (e.g., an Account ID input, a request info input, etc.), and can transmit one or more second output variables (e.g., the Account ID input, a billed Invoice ID output, the billed entity output, etc.) via a second API response.

In some examples, the dimension configuration 114 can be configured to define access permissions for the API and service environments that the API can be registered for. In particular, the dynamic proxy server 122 can be configured to transmit API calls and API call responses to and from the one or more service environments. It should be noted that the one or more service environments can include a production environment that a general population of users has access to, a testing environment that administrators of the one or more service environments register API modifications with, an entity specific environment that one or more entities and users associated with the entities have access to, a subscription environment where users gain access to APIs based at least on an active subscription, and other service environments that may be associated with a variety of access permissions. Further, the dimension configuration 114 can be generated by the service onboarding server 110 from the API configuration information 106 and the API service information 108. For example, the dimension configuration 114 for the Invoice Manager service can include an indication of a API state (e.g., active or inactive), a service environment that the Invoice Manager service is registered with (e.g., testing environment, production environment, etc.), an indication of a service endpoint, and other network information for the Invoice Manager service. Accordingly, the dimension configuration 114 can be configured to describe the routing of the one or more API calls to the API received by the dynamic proxy server 122 to the service endpoint(s) of the API.

In some additional examples, a plurality of dimension configurations can be generated for the service and registered with the service configuration 112 and the operation configuration 116. In particular, the plurality of dimension configurations can be configured such that an individual dimension configuration 114 defines access permissions and other routing information for the service within a service environment identified by the individual dimension configuration 114. Additionally, the plurality of dimension configuration can include additional dimension configuration(s) 114 that are associated with additional service environment(s), though these additional dimension configuration(s) can route API calls and API call responses to and from the service via the service endpoint and/or one or more additional endpoints. For example, test environment API calls can be routed by the dynamic proxy server 122 via a test environment endpoint based on a test environment dimension configuration. Further, various API calls and API call responses associated with one or more production environments can be routed by the dynamic proxy server 122 via a production environment endpoint based on or more production dimension configurations. Accordingly, a plurality of dimension configuration can be generated for the service such that the service and/or individual versions of the service can be accessed via the dynamic proxy server 122.

In some examples, the service configuration 112 can be configured to register the API with the dynamic proxy server 122 and the service/the operations to the service environments accessed via the dynamic proxy server 122. In particular, and based at least on the API configuration information 106 and the API service information 108, the service onboarding server 110 can be configured to generate the service configuration 112. The service configuration 112 can identify the service provided via the API and the endpoint associated with the service. More specifically, the endpoint associated with the service identifies a server and/or other processing device that is associated with the programs that comprise the service and the operations and receives the API call from the dynamic proxy server 122 within the service environments. Additionally, the service configuration 112 can indicate whether the service is currently active or inactive, a version of the API and the service, and other information regarding the service. Accordingly, the service configuration 112 can indicate where the service is located within the one or more service environments and where the programs/code base for the service and the operations is located. It should be noted that the programs and/or the code base of the service and the operations can represent the logical steps and modifications that occur during execution of an operation.

It should be noted that the API service information 106 and the API configuration information 108 are utilized by the service onboarding server 110 to generate the service configuration 112, the dimension configuration 114, and the operation configuration 116. In particular, the service onboarding server 110 can receive the API service information 106 and the API configuration information 108 and initialize the service configuration 112, the dimension configuration 114, and the operation configuration 116 within the service lookup database 124. More specifically, the service onboarding server 110 can be configured to generate and store the service configuration 112, the dimension configuration 114, and the operation configuration 116 within the API lookup database 124 such that the service onboarding server 110 can store associated information for the service within the API lookup database 124 and such that the dynamic proxy server 122 can access and utilize the information stored by the API lookup database 124. Additionally, the service configuration 112, the dimension configuration 114, and the operation configuration 116 stored by the API lookup database 124 can enable the dynamic proxy server 122 to receive, process, and route API calls to and from the service accessible via the service endpoint.

Additionally, it should be noted that a plurality of service versions, associated with the service and providing similar operations, can be registered across a plurality of service environments. In particular, the service may exist, in the plurality of service versions, in a plurality of service environments such that users and/or APIs associated with a service environment are capable of accessing the service within the service environment. Accordingly, individual versions of the service may be updated and registered with the plurality of service environments independent of the other versions of the service.

In some examples, the service onboarding server 110 can be configured to register the API with the dynamic proxy server 122 based at least on the API configuration comprised of the service configuration 112, the dimension configuration 114, and the operation configuration 116. In addition, the service onboarding server 110 can generate the operation queue 118 and the operation reporting function 120. In particular, the operation queue 118 can be configured to receive a plurality of API calls from one or more users and/or one or more active services. More specifically, the operation queue 118 can be configured to receive and prioritize incoming API calls based on a source of the API call, the service environment the API call is associated with, and the computation load of the access endpoint associated with the API call for the plurality of services that have been registered with the dynamic proxy server 122. Additionally, the operation queue 118 can prioritize API calls from the operations that are being evaluated by the services within the one or more service environments such that the incoming API calls from the services with active operations are prioritized over the incoming API calls from external sources (e.g., users, entities, etc.). Further, as the plurality of API calls are transmitted to the respective access endpoints of the services and the operations associated with the plurality of API calls are completed, the access endpoints can transmit a plurality of API call responses. The API call responses can be monitored by the operation reporting function 120 that augments the API call responses with an operation report identifying API exceptions that were generated by the service environment(s) associated with the API call and the operation(s) activated by the API call. Accordingly, the operation reporting function 120 can be configured to identify and report API exceptions that are generated within the service environment(s) by the active operations.

In some examples, registering the service with the service environments and the API to the dynamic proxy server can include generating the API access information 126 and the API operations information 128 that are stored in the API lookup database 124. In particular, the API configuration can be generated by the service onboarding server 110 to enable the service and the operations of the service to be accessed via API calls transmitted via the dynamic proxy server. Additionally, the API access information 126 can be generated from the API configuration to list the API calls available within the one or more service environments such that a user can identify the API call that is to be transmitted to trigger a desired operation. Similarly, the API operation information 128 can be configured to list the API structures associated with the plurality API calls such that the user can configure the API call to provide the associated operation the input variables to complete the action desired by the user. Accordingly, the API lookup database 124 can store the API access information 126 for identifying the API call associated with a desired service and a desired operation of the desired service. Further, the API lookup database 124 can store the API operations information 128 for identifying the call structure of the API call for the desired operation such that the desired operation causes and/or returns a desired output.

Figure 2:
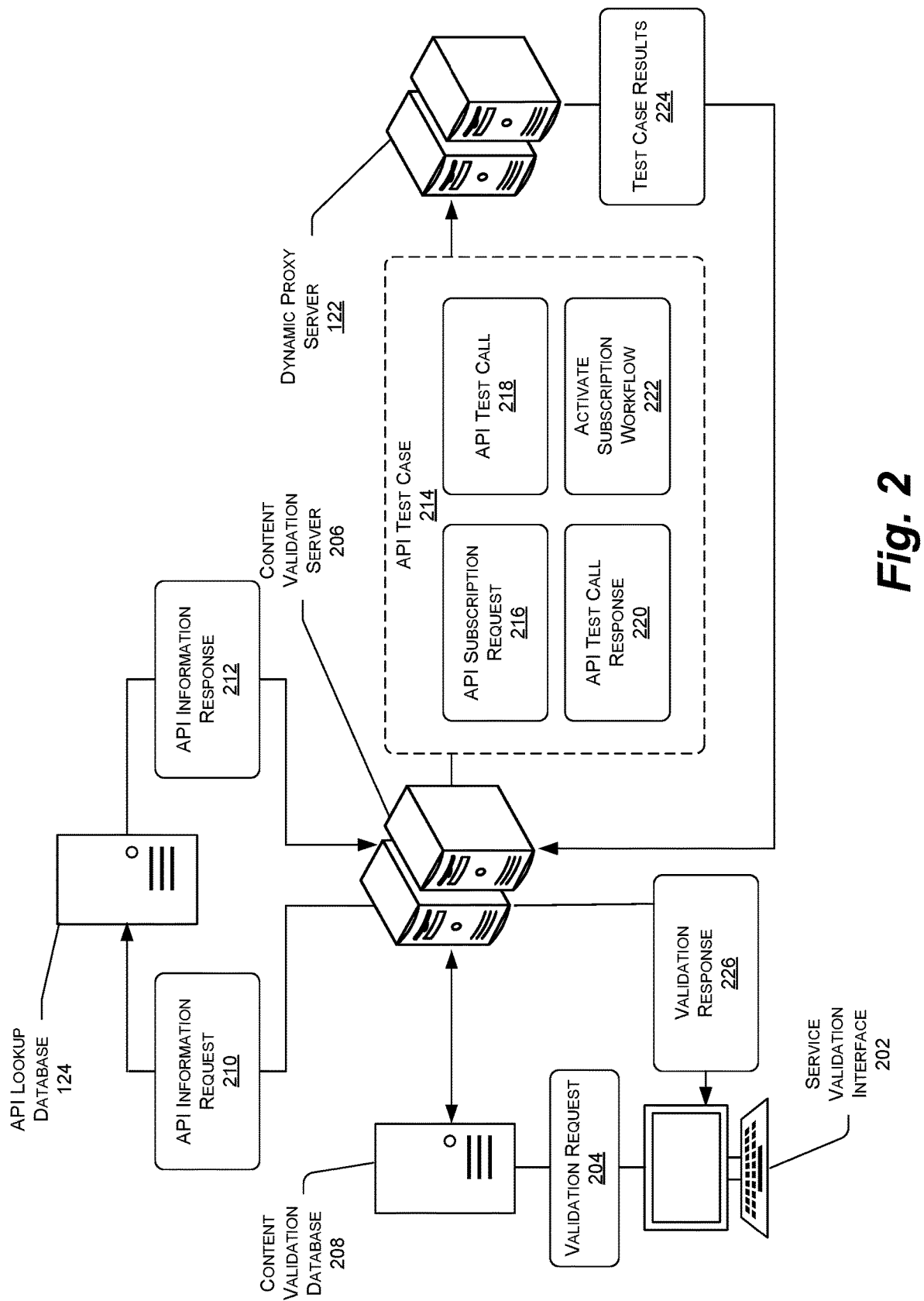
FIG. 2 illustrates a validation system for determining whether a service, an API and/or a modification to a service has been registered with a service environment and whether the service and the API function within the service environment.

FIG. 2 illustrates a validation system for determining whether a service, an API, and/or a modification to a service has been registered with a service environment and whether the service and the API function within the service environment. In particular, a service validation interface 202 can transmit a validation request 204 to content validation server 206 to determine whether the API and the service are functional within the service environment, wherein the validation request 204 and the information generated by the content validation server 206 can be stored within a content validation database 208. Additionally, the content validation server 206 can transmit, to an API lookup database 124, an API information request 210 and receive an API information response 212. Further, the content validation service 206 can be configured to utilize the API configuration received via the API information response 212 to generate an API test case 214 comprised of an API subscription request 216, an API test call 218, an API test call response 220, and an activation 222 of the API workflow. Accordingly, the API test case 214 can be executed by the dynamic proxy server 122 and result in a test case result 224 being transmitted to the content validation server 206 and causing the validation response 226 to be generated.

In some examples, the service validation interface 202 can be configured to generate and transmit the validation request 204 to the content validation server 206. In particular, the service validation interface 202 can be a user interface that enables a user and/or an administrator to request validation for a submitted API update and/or a submitted API modification. Alternatively, or in addition, the service validation interface 202 can be associated with the service onboarding server 110 and can detect when a service submitted via the onboarding queue 102 has been analyzed by the service onboarding server 110 and are activated within a service environment. Further, the content validation interface 202 can be configured to generate the validation request 204 based at least on the API being registered with and enabled via the dynamic proxy server 122. Accordingly, the service validation interface 202 can determine that the API is available to users and to the one or more additional APIs associated with the dynamic proxy server 122 and generate the validation request 204.

In some examples, the validation request 204 can be generated by the service validation interface 202 and transmitted to the content validation server 206. In particular, the validation request 204 can identify the service that is to be tested to determine whether the API and the operations associated with the service properly function within the service environment that the service is registered with and that the one or more additional APIs are able to interact with the service. More specifically, the one or more additional APIs can include a first type of dependency wherein one or more additional services associated with the one or more APIs are dependent on at least the operation that can be accessed via the API. Alternatively, the one or more APIs can include a second type of dependency wherein the operation of the service includes an internal API call that activates an additional API of the one or more additional APIs in order to generate the one or more output variables. Accordingly, the validation request 204 can be generated and utilized by the content validation server 206 to determine whether the service, independent of whether the service is a new service within the service environment or the service is updated via a service modification, is able to be accessed via the dynamic proxy server 122 and is able to execute the operation associated with an incoming API call such that one or more output variables are returned via the API call response.

In some examples, the validation request 204 can cause the content validation service 206 to obtain the API access information 126 and the API operations information 128. More specifically, the validation request 204 can cause the content validation service 206 to generate the API information request 210 and transmit the API information request 210 to an API lookup database 124 associated with the content validation server 206. It should be noted that the API lookup database 124 can be the API lookup database 124 and/or can be a separate API lookup database 124 that is configured to enable the API test case 214 to be generated by the content validation server 206. In particular, the API lookup database 124 can include the API access information 126 and the API operations information 128 that describe the plurality of API calls that are available for the service within the service environment, the call structure the plurality of API calls such that a generated API call can be determined by the content validation service 206, and the interactions between the service and the one or more additional APIs associated with the dynamic proxy server 122. Accordingly, the API information request 210 can be configured to identify the operation that has been added and/or modified by the onboarding request and cause the API lookup database to return the API access information 126 and the API operations information 128 associated with the operation.

In at least one example, the API information request 210 can cause the API lookup database 124 to generate the API information response 212 that includes the API access information 126 and the API operations information 128 associated with the operation and/or the service. As noted above, the validation request 204 can cause the content validation service 206 to initiate testing for a modified operation that was registered with the service environment and the dynamic proxy server 122 based on an onboarding request that was completed by the service onboarding server 110. Additionally, the validation request 204 can include an indication of one or more dependencies of the modified operation, including both dependencies of the first type (e.g., additional services calling the modified operation) and the second type (e.g., the modified operation call the additional services). Accordingly, the API information request 210 can cause the API lookup database 124 to return the API information response 212 including the API call structure for incoming API calls for the modified operation via the dynamic proxy server 122 and for outgoing API calls that are generated by the modified operation.

In some examples, the content validation server 206 can receive the API information response 212 and generate the API test case 214 for the modified operation. In particular, the content validation server 206 can generate the API subscription request 216, the API test call 218, the API test call response 220, and the activation command 222 for the subscription workflow. More specifically, the content validation server 206 can be configured to generate the API test case 214 such that the API test case 214 simulates a user obtaining access to the service, initiating the API test call 218, receiving the API test call response 220, and activating the operation and/or operations of a workflow. Additionally, the API test case 214 can be configured to dynamically activate the modified operation based at least on service information, the one or more input parameters, API call structure, and other request parameters indicated by the API information response 212. Accordingly, the API test case 214 can be configured to cause the modified operation to execute either the service environment based at least on direct API calls to the modified operation and indirect API calls that trigger the modified operation via the one or more additional APIs within the service environment.

In some examples, the content validation database 208 can be configured to receive and store the validation request 204 for the content validation server 206. Additionally, the content validation database 208 can be configured to receive and store the test case 214 generated by the content validation server 206 and data generated by the test case 214 when the test case is executed by the content validation server 206 and the dynamic proxy server 122. More specifically, the API call responses (e.g., the API test call response 220) that are generated by the service within the service environment in response to one or more API calls (e.g., API test call 218, API calls of the subscription workflow, etc.) can be logged and stored by the content validation database 208.

In some examples, the API test case 214 can include the API subscription request 216. In particular, the API subscription request 216 can be an entry point for the API test case 214 that enables access of the API test case 214 to the service that includes the modified operation and the one or more additional services associated with the modified operation. Additionally, the API subscription request 216 can be configured to determine whether the access permissions for the modified operation and the associated APIs (e.g., the API for the service and the one or more additional APIs associated with the one or more services that include dependencies on and/or of the modified service) have been properly implemented for the categories of users associated with the service environment. For example, the API subscription request 216 can be configured to execute the API test case 214 as originating from a developer associated with a testing service environment and as a general population user that has been granted access to the testing service environment. Due to the difference in user category between the developer and the general population user, the modified operation may respond differently to a first API call that is associated with the developer compared to a second API call that is associated with the general population user. Accordingly, the API subscription request 216 can enable the test case 214 to simulate a test case user that is requesting access to the service via the API and determine whether the service and the modified operation appropriately respond the test case user based at least on the dimension configuration 114 of the API registered with the dynamic proxy server 122.

In some examples, the API test case 214 can include the API test call 218 that is transmitted to the service via the dynamic proxy server 122. In particular, the API test call 218 can be configured to determine whether the API of the service has been registered with the dynamic proxy server 122 such that API calls to the service are received and routed by the dynamic proxy server 122 to the access endpoint within the service environment associated with the service. Additionally, the API test call 218 can be configured to determine whether the modified operation is activated by the API test call 218 submitted via the dynamic proxy server 122. Due to the dynamic proxy server 122 isolating the access point of the service and the operation from a source of the API call, the API test call 218 can be configured such to determine that API calls with appropriate permissions are able to be routed, via the dynamic proxy server, from an API call source to the access endpoint. For example, the dynamic proxy server 122 can be a centralized service that operates to federate operation of the services and the APIs that are associated with the one or more service environments. Additionally, the dynamic proxy server 122 can enable two systems, that are remote from each other and potentially a part of separate service environments, to be able to issue API calls via the dynamic proxy server 122, based at least on the two systems having dimension configurations permitting the API calls to be issued via the dynamic proxy server 122. Accordingly, the API test call 218 can be configured to determine whether the dynamic proxy server 122 is able to route API calls to and from the modified operation via the access endpoint of the service associated with the modified operation.

In some examples, the API test case 214 can include the API test call response 220 that is transmitted by the modified operation to the dynamic proxy server 122 in response to the API test call 218. In particular, the API test call response 220 can be configured to determine whether the modified operation has been integrated into the service and is capable of executing within the service environment and generating the one or more output variables from the one or more input variables. Additionally, the API test call response 220 can indicate that the modified operation transmitting one or more operation exceptions that prevent and/or alter the generation of the one or more output variables. Accordingly, the test case 214 can be configured to receive the API test call response 220 and record the one or more output variables generated by the modified operation in response to the API test call 218. Alternatively, or in addition, the modified operation may be configured to transmit the one or more output variables to an operation endpoint, such as a database, for storage of the output variables (e.g., the modified operation generates a user profile and causes the user profile to be stored by a user profile database). Further, the API test call response 220 may include an indication that the operation has been completed by the service. In response, the content validation server 206 can be configured to access the operation endpoint to obtain the one or more output variables generated by the modified operation.

In some examples, the test case 214 can include a workflow that is configured to iterate through the modified operation within the service and via the one or more additional APIs that are associated with the modified operation via the first type and the second type of dependencies. In particular, the test case 214 can determine whether the modified operation is accessible to users and other entities via the API subscription request 216, whether the modified operation is registered with the dynamic proxy server via the API test call 218, and whether the modified operation is operable within the service environment via the API test call response 220. Accordingly, the test case 214 can trigger the activation 222 of the subscription workflow that is configured to trigger the modified operation directly through API calls, trigger the modified operation indirectly through additional API calls to the one or more additional APIs that include the first type of dependency, and monitor the one or more additional APIs that the modified operation depends on.

In some examples, the test case 214 causes the dynamic proxy server 122 to generate the test case results and transmit the test case results to the content validation server 206. Alternatively, or in addition, the test case 214 can be executed by the content validation server 206 and cause the test case results 224 generated by the modified operation to be returned, via API call responses and other reporting tools (e.g., operation exceptions generated by the modified operation, the service, the API, the one or more additional APIs, etc.), to the content validation server 206. Additionally, the test case results 224 can include indications of the one or more output variables generated by the modified operation during the API test case 214.

In some examples, the service can be a billing management service (e.g., a service) that is accessed via an API and is registered with a billing server (e.g., an access endpoint within a corporations billing environment (e.g., service environment)). It should be noted that while the following example describes the utilization of a billing management service, similar systems can be implemented for user profile management services, subscription services, digital shopping services, entertainment services, and other services that utilize large numbers of operations to complete user requests and activities. Additionally, the billing management service can include one or more billing management operations. For example, the billing management service can include the billing management operations of generate bill for time period, generate billing invoice, get payment instrument, get payment information, store payment instrument, store payment information, change account attribute, and other operations associated with the billing management server. Additionally, the billing management operations can be individually associated with at least an API call per operation, wherein the API call enables one or more users and one or more related operations to trigger execution of the billing management operations. For example, the API call for the get payment information operation can identify the billing management service, the billing server, the billing management operation, and one or more inputs for the get payment information operation (e.g., account name, account password, payment instrument identifier, etc.). Accordingly, a user can transmit the API call with the one or more inputs and cause the billing management service to execute the get payment information operation and acquire payment information for a payment instrument associated with the user.

Additionally, the billing management service can be modified. For example, the billing management service can be modified so that user account-based operations (e.g., get payment instrument, get payment information, store payment instrument, store payment information, etc.) generate an internal API call that is transmitted to a user account service. The modification to the billing management service can include changes to permissions (e.g., only users associated with an activated user profile can utilize the user-account based operations), API call structure (e.g., API calls now include a verification input), and other changes to the API (e.g., modification of the API configuration). Accordingly, an onboarding server (e.g., service onboarding server 110) that registers the modification with the billing management service and the API of the billing management service can trigger a validation (e.g., via the validation request 204 and the content validation server 206) for the billing management service and the API to ensure that the user account-based operations are able to execute despite the transmission of the internal API call to the user account service. Further, a test scenario (e.g., API test case 214) can be generated to determine whether the billing management service and the API remain operable.

Further, the test scenario can be configured to simulate the workflow through the billing service for each of the user account-based operations to determine whether the billing management service remains operable. In particular, the test scenario can cause one or more test users (e.g., a user with a user account, a user without a user account, an enterprise user, etc.) to transmit a subscription request (e.g., API subscription request 216) to acquire access to the billing management service. Additionally, the test users that are not permitted to access the billing management service can receive a subscription response rejecting the subscription request. Alternatively, the test users that are permitted to access the billing management service can receive a subscription response granting access. Further, the test users that are granted access can then proceed to iterate through the billing management operations, via generated API calls for each billing management operation, to ensure that the modified billing management operations successfully execute.

Figure 3:
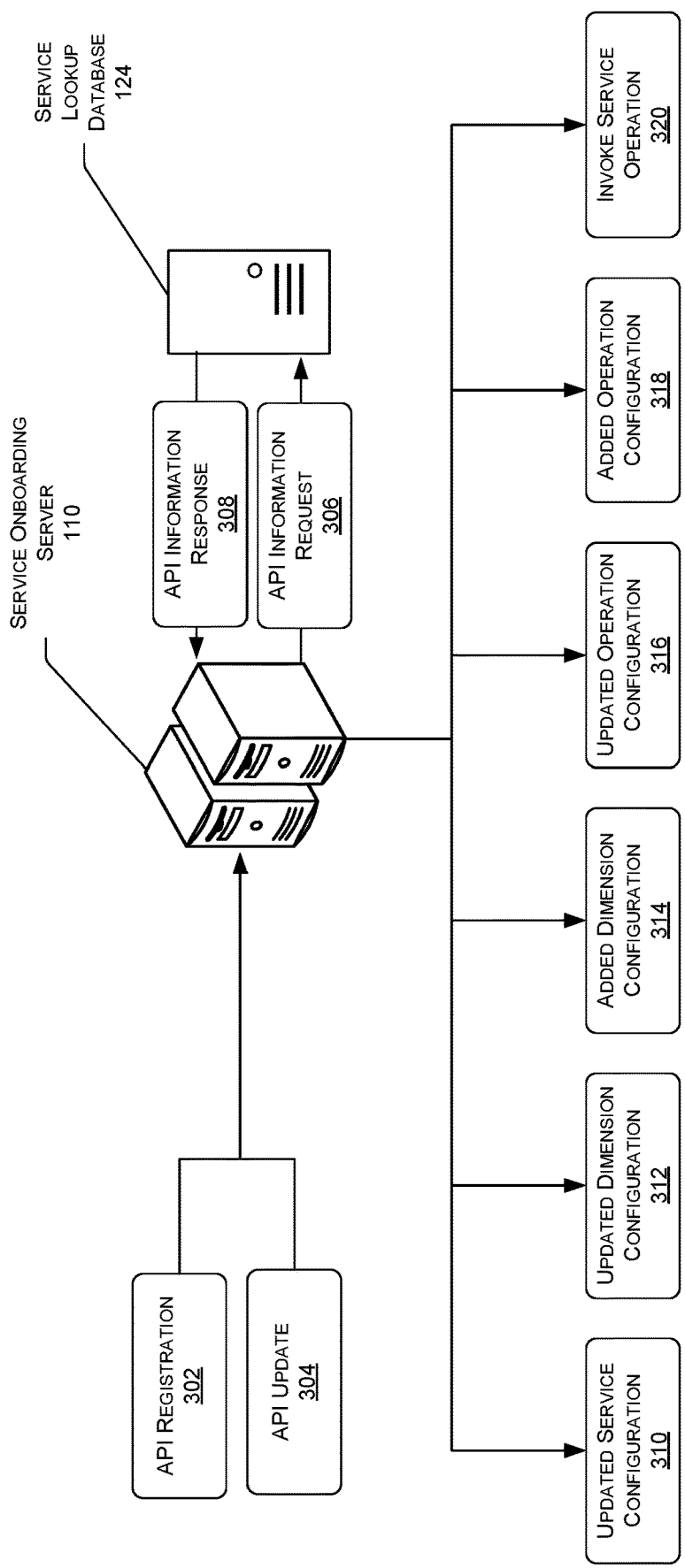
FIG. 3 illustrates a service onboarding server receiving a registration for an API that includes an API configuration to be registered with a dynamic proxy server and determining whether the API configuration is a modified API configuration or a new API configuration.

FIG. 3 illustrates a service onboarding server receiving a registration for an API that includes an API configuration to be registered with a dynamic proxy server and determining whether the API configuration is a modified API configuration or a new API configuration. In particular, the service onboarding server 110 can receive an API registration 302 and an API update that causes the service onboarding server 110 to generate an API information request 306 and receive an API information response 308 from the service lookup database 124. Additionally, the service onboarding server 110 can receive the API information response 308 and determine, based at least on the API registration and the API update, whether the API update includes an updated service configuration 310, an updated dimension configuration 312, an added dimension configuration 314, an updated operation configuration 316, an added operation configuration 318, and/or an invoke service operation 320.

In some examples, the API registration information 302 can be configured to identify the API and/or the service that the API update 304 is associated with. More specifically, the API registration information 302 can identify the API and/or the server that that the API update 304 is to be applied to. Additionally, the API registration information 302 can include identifying information for the service such as an IP address of the access endpoint, a service ID, an API version number, a service state, an API state, a service environment of the service and/or API, and other information that is related to and indicative of the service updated by the API updated 304. Accordingly, the service onboarding server 110 can be configured to receive the API registration information 302 and identify the API and/or the service that the API update 304 is to be applied to.

In some examples, the service onboarding server 110 can be configured to receive the API registration 302 and generate the API information request 306. In particular, the API registration 304 provides the service onboarding server 110 the identifying information utilized to generate the API information request 306. Additionally, the API information request 306 can cause the service lookup database 124 to identify the API configuration for the service including the service configuration, the dimension configuration, and the operation configuration. Further, the service lookup database 124 can be configured to obtain registration information that identifies a proxy server associated with the API and the service, identifies one or more additional services that are dependent on the service, and/or identifies one or more further services that one or more operations of the service are dependent on. It should be noted that while the one or more additional services and the one or more further services are only removed from the service and the one or more operations by a single dependency (e.g., the one or more additional services are directly dependent on the service and the service is directly dependent on the one or more further services), the service lookup database 124 can be configured to store and identify any number of dependencies separating the service and, by extension, the API from the one or more additional services (e.g., services that are dependent on the service and utilize the API to access the operations of the service) and the one or more further services (e.g., services that the operations of the service are dependent on and that are accessed via one or more further APIs). Accordingly, the API lookup database 124 can be configured to identify and return, via the API information response 308, the API configuration for the service, the operations that are accessed via the API, and a set of dependencies associated with the service and/or the API.

In some examples, the service onboarding server 110 can be configured to determine one or more modifications to be applied to the service and/or the API based at least on the API update 304. It should be noted that the one or modifications applied by the API update 304 can include integration of new operations and configuration information to the service and/or integration of updates to existing operations and existing configuration information. More specifically, the service onboarding server 110 can be configured to determine whether the API update 304 includes at least one of the updated service configuration 310, the updated dimension configuration 312, the added dimension configuration 314, the updated operation configuration 316, the added operation configuration 318, and/or the invoke service operation 320. For example, the service onboarding server 110 can determine that the API update 304 includes an operation configuration for a generate billing report operation that is associated with a billing system. Additionally, the service onboarding server 110 can be configured determine that the API information response 308 indicates that the billing service includes the generate billing report operation and that identifying information associated with the generate billing report operation and the API update 304 matches the identifying information of the generate billing report operation identified by the service lookup database 124. Accordingly, the service onboarding server 110 can determine that the API update 304 includes the updated operation configuration 316 and implement the API update 304 for the service and/or the API.

In some examples, the service onboarding server 110 can determine that the API update includes the updated service configuration 310. In particular, the updated service configuration 310 can be identified based at least on a modification to the access endpoint associated with the service, updated identifying information associated with the service (e.g., change in service name or service IP address while maintaining the same operations and dimensions), a modification to the one or more service environments associated with the service, and other modifications to the service configuration 112. Similarly, the updated service configuration 310 can be identified based at least on a modification of the API call for the service, API forwarding information for the dynamic proxy server 122, and other related information that modifies the API for the service. Additionally, some modifications to the dimension configuration 114 and the operation configuration 116 can trigger the updated service configuration 310, such as modifications to the permissions associated with the one or more service environments and introduction of a new operation to the service. Accordingly, the service configuration 112 can be extracted from the API configuration for the service and/or the API and the API update 304 can be applied to the service configuration 112 to generate the updated service configuration 310. Further, the updated service configuration 310 can reintegrated into the API configuration with the dimension configuration 114 and the operation configuration 116.

In some examples, the service onboarding server 110 can determine that the API update includes the updated dimension configuration 312. In particular, the updated dimension configuration 312 can be identified based at least on a modification to the permissions associated with the service environment, routing of API calls and API responses to the service via the API by the dynamic proxy server 122, routing information for the access endpoint of the service and the one or more operations, and other modifications to the dimension configuration 114. Similarly, the updated dimension configuration 312 can be identified based at least on an update to the routing of API calls by the dynamic proxy server, permission for one or more additional services to access the API of the service, and other related information that modifies interactions between the API and the dimension configuration 114. Additionally, some modifications to the service configuration 112, as noted above, and the operation configuration 116 can trigger the updated service configuration 310, such as the introduction of a new operation to the service and the modification of the access endpoint for the service. Accordingly, the dimension configuration 114 can be extracted from the API configuration for the service and/or the API and the API update 304 can be applied to the dimension configuration 114 to generate the updated dimension configuration 312. Further, the updated dimension configuration 312 can be reintegrated into the API configuration with the service configuration 112 and the operation configuration 116.

In some examples, the service onboarding server 110 can determine that the API update 304 includes the added dimension configuration 314 that is distinct from the dimension configuration 114 of the API configuration. In particular, the added dimension configuration 314 can include newly generated permissions for a new category of users, a new service environment, a new version of the service and/or the API, and the integration of other features into the service and/or the API that were not included in the dimension configuration 114. It should be noted that in some examples, the distinction between a first version and a second version of the service and/or the API can enable additional functionality, updated data processing and storage, introduction of additional back-end systems and servers (e.g., both physical and virtual components configured to execute the service and/or the one or more operations of the service), and other fundamental alterations to the service, the API, the operations, and/or the dynamic proxy server 122. Accordingly, the dimension configuration 114 can be modified to include the added dimension configuration 314.

In some examples, the service onboarding server 110 can determine that the API update includes the updated operation configuration 316. In particular, the updated operation configuration 316 can be determined based at least on the API update including a modification to the API call structure of the one or more operations associated with the service, updated identifying information associated with the one or more operations (e.g., change in operation name or operation IP address while maintaining the service configuration 112 and the dimension configuration 114), an additional modification to the one or more inputs received via the API call of the one or more operations, a further modification of the one or more outputs generated by the one or more operations, an update to an internal API call generated by the one or more operations, and other modifications to the operation configuration 116. Similarly, the updated operation configuration 316 can be identified based at least on an update to one or more additional API calls generated by one or more associated services (e.g., the one or more additional services are dependent on the operation) and other related information that modifies the transfer of information between the one or more operations of the service and the service environments. Accordingly, the operation configuration 116 can be extracted from the API configuration for the service and/or the API and the API update 304 can be applied to the operation configuration 116 to generate the updated operation configuration 316. Further, the updated operation configuration 316 can reintegrated into the API configuration with the service configuration 112 and the dimension configuration 114.

In some examples, the service onboarding server 110 can determine that the API update 304 includes the added operation configuration 318 that is distinct from the operation configuration 116 of the API configuration. In particular, the added operation configuration 318 can a new operation that is to be integrated into the service, a new API call structure for the new operation and/or an existing operation, and other operation features that are introduced to the service and/or the API. It should be noted that in some examples, the distinction between a first version and a second version of the service and/or the API can enable additional functionality, updated data processing and data storage, introduction of additional back-end systems and servers (e.g., both physical and virtual components configured to execute the one or more operations of the service), and other fundamental alterations to the one or more operations. Accordingly, the operation configuration 116 can be modified to include the added operation configuration 318.

In some additional examples, the above modifications to the service, the one or more operations, and the API can trigger validation of the updated service configuration 310, the updated dimension configuration 312, the added dimension configuration 314, the updated operation configuration 316 and the added operation configuration 318. In particular, the service onboarding server 110 can be configured to generate a request that invokes validation of the API configuration. Due to the modification of the API configuration by the API update 304, the service onboarding server 110 can determine that the updated service, the updated operations, and/or the update API are to be validated to determine whether the API update 304 introduced one or more errors. Accordingly, the service onboarding server 110 can submit identifying information from the API registration 302 to the content validation server 204 via the invoke service operation 320 interface (e.g., the service validation interface 202).

Figure 4:
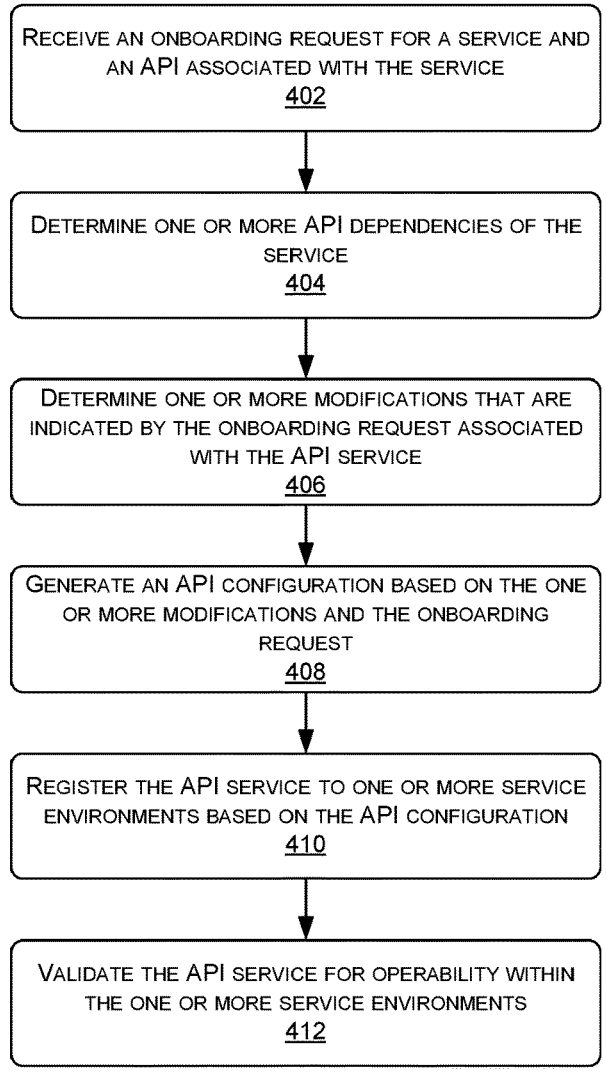
FIG. 4 illustrates a flow diagram that describes a process for analyzing and onboarding a service and an API for registration with a dynamic proxy server within a service environment.

FIG. 4 illustrates a flow diagram that describes a process for analyzing and onboarding a service and an API for registration with a dynamic proxy server within a service environment. In particular, the fluid diagram can describe the generation of an API configuration for a service, such as a billing service, that describes the handing of API calls and the routing of information by a proxy server (e.g., the dynamic proxy server 122). It should be noted that while the below discussion references an exemplary billing service, the steps below can be generalized to invoice management, user profile creation and modification, data management, and other API services.

At block 402, an onboarding server can receive an onboarding request for that identifies a billing service and an application data interface (API) associated with the billing service that are to be integrated into a service environment hosted on a billing server. Additionally, the onboarding request can include one or more modifications to the billing service and the API. It should be noted that the one or more modifications to the billing service can be updates that are applied to an existing billing service and/or an integration of the billing service (e.g., a generated service that is being added to the service environment) to the service environment. Similarly, the one or modifications to the API can be updates that are applied to an existing API of the billing service and/or an integration of the API with the proxy server for routing API calls and API call responses within the service environment. Accordingly, the billing service and the API can be added to an onboarding queue for integration to the one or more service environments associated with the proxy server.

At block 404, the onboarding server can be configured to determine one or more API dependencies that are associated with the billing service based at least on the API. In particular, the API can be configured to enable the one or more billing operations of the billing service to be accessed by the one or more user categories and by one or more additional services associated with the billing service. Similarly, the API can be further configured to enable the one or more billing operations of the billing service to access one or more additional operations associated with the one or more additional services. The interaction of the one or more billing operations and the one or more additional operations can be classified as a first type of dependency (e.g., the one or more additional operations are configured to generate and transmit an API call to the one or more billing operations) or a second type of dependency (e.g., the one or more billing operations are configured to generate and transmit an additional API call to the one or more additional operations). Additionally, the dependencies between the one or more billing operations and the one or more additional operations can cause the billing service and the additional service to exchange API calls and API responses to provide the input variables for the API call and/or the additional API call and obtain the output variables generated by the one the one or more billing operations and the one or more additional operations. For example, the additional service can be a user profile report service that is configured to report activity that has occurred for a user profile over a period of time. Additionally, the one or more additional operations of the additional service can be configured to include a get billing report operation, wherein the get billing report operation is dependent on a billing operation of the billing service. Accordingly, the get billing report operation can be configured to generate a billing report API call that is transmitted, via the proxy server, to the billing operation and causes the billing operation to generate and return, via a billing report API call response, the billing report requested by the get billing report operation.

At block 406, the onboarding service can be configured to determine one or more modifications based at least on the onboarding request. In general, the onboarding request can contain an indication (such as the API update 304) that enables the onboarding server to determine whether the one or more modifications add or update the API configuration as discussed by FIG. 3.

At block 408, the onboarding server can determine an API configuration that enables one or more billing operations of the billing service to be accessed by users associated with the service environment. Additionally, the one or more modifications of the onboarding request can include API configuration information and API service information that can be utilized to generate the API configuration and the service configuration, the dimension configuration, and the operation configuration of the API configuration.

As noted above, the service configuration can identify the billing server that the billing service is registered with by the onboarding server. Additionally, the service configuration can define the one or more billing operations for the billing server such that the billing server is configured to execute the one or more billing operations in response to an API call associated with the one or more billing operations. Similarly, the dimensional configuration can include permissions for the proxy server to transmit the API call and one or more API calls between the one or more billing operations and one or more additional services that are associated with the billing service via operation dependencies. Further, the permissions of the dimensional configuration can define API call handling for one or more user categories that may generate the API call and cause the one or more billing operations to execute via the billing server. In addition, the operational configuration can include an API call structure for the API call that includes one or more input variables for a billing operation and an identifier of the billing service and/or the billing operation;

At block 410, the onboarding server can be configured to register the billing service with the billing server associated with the service environment. In particular, the onboarding server can register the API with the proxy server based at least on the API configuration and cause the proxy server to route the API calls of the billing service to the billing server via the service environment. Additionally, the proxy server can be configured such that an incoming API call received by the proxy server is parsed to identify a service ID, an operation ID, and/or other identifier of the billing service and/or the billing operation and routed, via the service environment, to the access endpoint of the billing service at the billing server.

At block 412, the onboarding server can be configured to trigger validation of the billing service and/or the API via a content validation server. In particular, and based on the one or more modifications being applied to service environment via the billing service and the API, the onboarding server can cause the content validation server to generate a test case that is configured to determine whether the billing service and the API are operable within the service environment. Additionally, the test case can be configured to determine whether the one or more billing operations execute via the billing server, whether the API calls of the billing service are routed to the one or more billing operations by the proxy server and/or the billing service, and whether the dependencies associated with the billing service are operable within the service environment. Accordingly, the test case can be executed by the onboarding server and/or other server associated with the proxy server to validate the one or more billing operations.

Figure 5:
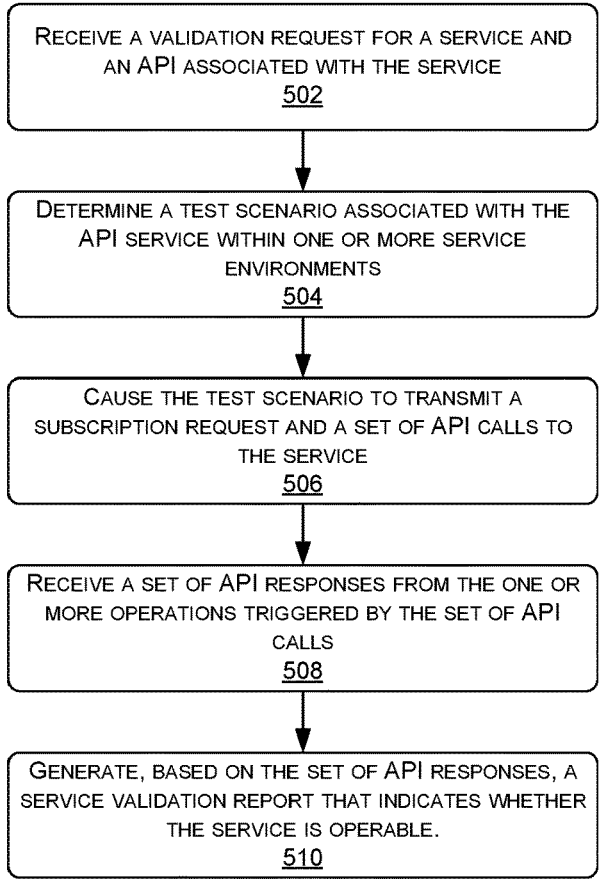
FIG. 5 illustrates an example flow diagram that describes validation of a service and an API that has been registered with one or more service environments based on an onboarding request to determine whether the service and the API are functional.

FIG. 5 illustrates an example flow diagram that describes validation of a service and an API that has been registered with one or more service environments based on an onboarding request to determine whether the service and the API are functional. Similar to FIG. 1 through FIG. 4, the validation process can be initiated after an onboarding request is received and processed for a service that is accessed via an API, wherein the service includes one or more operations that are activated by one or more API calls of the API. Accordingly, the validation of the service and the API can be initiated after that one or more modifications have been applied to the service within a service environment.

At block 502, a validation server can receive a validation request from the onboarding server and/or an interface associated with the validation server. The validation request can identify the service and the API that will be validated by the validation server.

At block 504, the validation server can determine a test scenario (e.g., the API test case 214) for the service and the API that is configured to determine whether the service and the API are operable within the service environment. In particular, the validation server can generate the test scenario to simulate a user and/or an administrator subscribing to the service and/or the API to transmit a set of API calls to the service that cause the service and the one or more operations of the service to generate a set of API call responses for the set of API calls. Additionally, the subscription request can be associated with a test user that belongs to a category of users that has a set of permissions for accessing the one or more service environments, the one or more services, and the one or more operations that are accessible via APIs associated with the proxy server. Further, the test scenario can be configured such that the subscription request is an initial step of the test scenario. Upon receiving the subscription request, the proxy server can analyze the subscription response to determine whether the service associated with the subscription request has been registered with the proxy server and whether the one or more operations can be accessed by the test user via an external API call. Accordingly, the test scenario can be initiated from a permission check for a source of the API call and continue through the set of API calls to the service via the proxy server.

It should be noted that the subscription request can be configured to determine whether a dimension configuration of the API has been implemented as access permissions for one or more categories of users and additional access permissions for one or more additional APIs. Additionally, the access permissions for the one or more categories of users can be configured to define whether a category of users is permitted to access the one or more operations within the service environment via the access endpoint of the service. Further, the additional access permissions for the one or more additional APIs can be configured to define additional API calls that are permitted between the one or more operations and one or more additional services associated with the one or more additional APIs At block 506, the validation server can cause the test scenario to transmit the subscription request for the service, the set of API calls for the one or more operations, and cause one or more input variables to be provided to the one or more operations via the set of API calls. In particular, the set of API calls transmitted by the test scenario can be configured to provide the one or more operations the one or more input variables and cause the one or more operations to generate the one or more output variables. Additionally, the set of API calls can be configured to cause the service environment to execute, via the service, the one or more operations to generate the one or more output variables. Further, the set of API call responses can be generated to indicate that the one or more operations have been executed within the service environment.

At block 508, the validation server can receive, from the one or more operations and the service, a subscription response, a set of API call responses, and one or more output variables provided via the set of API call responses. As noted above, the subscription response can indicate that the test user and/or the one or more additional operations associated with the test scenario had permission to access the service/the one or more operations and that the set of API calls was routed to the access endpoint of the service. Alternatively, or in addition, the subscription response can indicate that the test user and/or the one or more additional operations were rejected and the set of API calls was not received. Additionally, the set of API call responses can be configured to identify the one or more output variables of the operation. Further, the one or more output variables include at least one of an operation exception indicating that the operation encountered an error during execution, a first output transmitted by the operation via the API call response, and/or a second output generated by the operation and transmitted to an additional service within the service environment, wherein the API call response indicates that the additional service was triggered by the operation and that the operation has been executed. Accordingly, the one or more output variables, including the operation exception(s) generated by errors and/or operation failures can be utilized to generate the validation report.

At block 510, the validation server can be configured to determine, based at least in part on the subscription response and/or the set of API call responses, whether the one or more operations were executed within the service environment. Additionally, the validation server can be configured to determine, based at least on the subscription response and/or the API call responses, a service validation report that indicates whether the service and the API are operable within the service environment.

Figure 6:
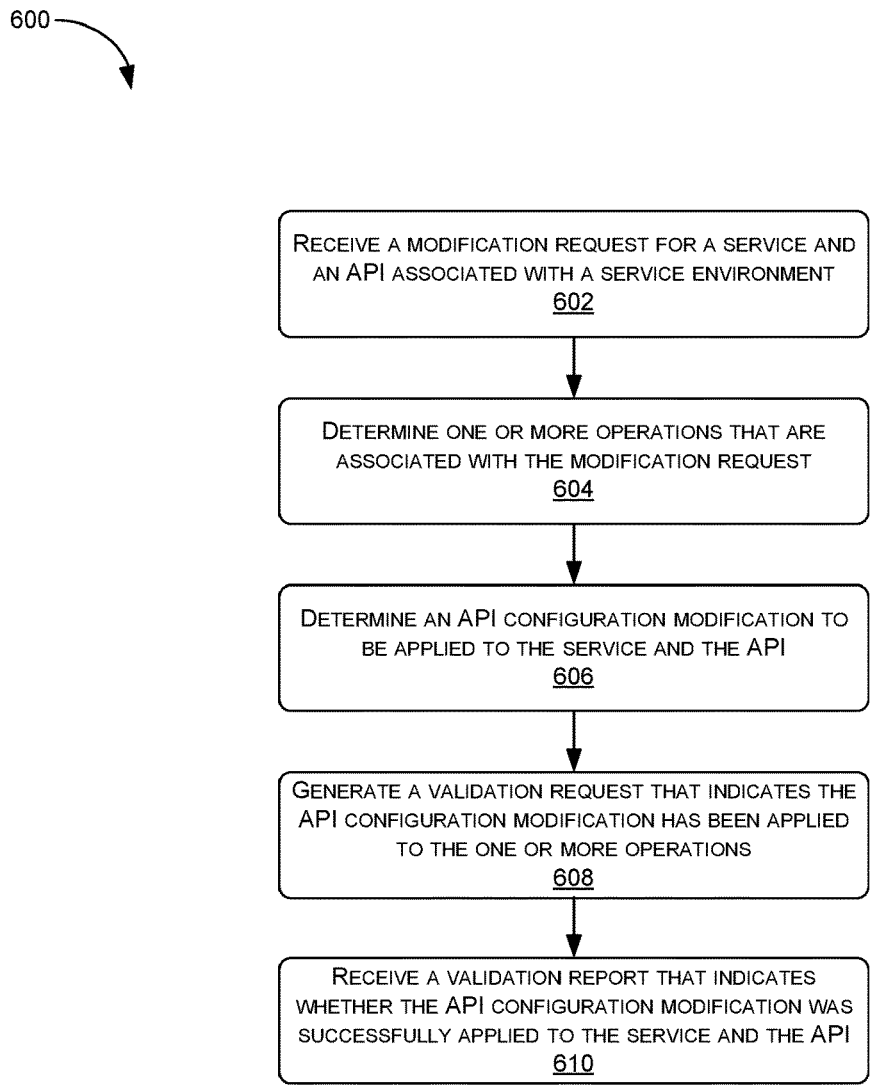
FIG. 6 illustrates an example flow diagram that describes implementation of a modification to a service and an API that is implemented based on a modification request that includes the modification to an API configuration.

FIG. 6 illustrates an example flow diagram that describes implementation of a modification to a service and an API that is implemented based on a modification request that includes the modification to an API configuration.

At block 602, and similar to FIG. 1 through FIG. 5, the onboarding server can receive a modification request for a service and/or an API that are associated with a service environment and a proxy server. In particular, the modification request can include an API registration (e.g., API registration 302) and an API update (e.g., API update 304). The modification request can be configured to include one or more updates for the service and/or the API. Additionally, the modification request can be configured to include one or more additions to the service and/or the API.

It should be noted that, at block 602, the modification request can be generated and submitted manually and/or initiated substantially automatically in response to an update for the API and/or the service associated with the API being deployed to a service environment/API endpoint. More specifically, developers associated with the service and/or the API can submit indications of the update for the API and/or the service that includes updates associated with API information such as the API service information 108 and/or the API configuration information 106. The indications can cause the service onboarding server 110 to integrate the update into the API configuration for the service and trigger the validation request 204. Accordingly, the service onboarding server 110 can be configured to submit the indications received in association with the update such that the content validations server 206 generates the API test case 214 to target the portions of the service and/or the API that were updated by the update.

At block 604, the onboarding server can be configured to determine one or more operations that are associated with the modification request. Additionally, the onboarding server can be configured to compare the service and the API to the API update to determine whether a service configuration, a dimension configuration, and/or an operation configuration is to be updated. Further, the onboarding server can determine whether the API update modifies existing components of the service and/or the API or implements new components for the service and/or the API.

At block 606, the onboarding service can be configured to identify an API configuration modification to be applied to the service and/or the API. In particular, the API configuration modification can include modifications such as those described by FIG. 3 (e.g., the updated dimension configuration 312, the added dimension configuration 314, the updated operation configuration 316, the added operation configuration 318, etc.). Alternatively, or in addition, the API configuration modification can include defining new dependencies between the service and one or more additional services, identifying and consolidating redundancies between the service and the one or more additional services, identifying inter-service boundaries that substantially prevent dependencies from being established, and other API configuration modifications.

At block 608, the onboarding service can be configured to generate a validation request. In particular, the validation request can be configured to indicate the API configuration modification that has been applied to the service and/or the API. This can include an indication of the modifications described by FIG. 3 and/or the above modifications that are associated with routing rules and routing organization for the proxy server. Additionally, the indication of the API configuration modification can be further configured to applied to the test scenario, wherein an indication that an inter-service boundary was established can cause the test scenario to attempt to implement a dependency between a first service and a second service that are prevented from forming a dependency. Similarly, an indication that a first service (or one or more first operations) was consolidated with a second service (or one or more second operations) can cause the test scenario to transmit an API call to the first service and/or the one or more first operations that were consolidated into the second service. Accordingly, the API configuration modification can cause a validation system to generate the test scenario to validate the API configuration modification.

At block 610, the onboarding service can receive a validation report from the validation server. In particular, the onboarding service can receive the validation report and determine whether the API configuration modification was applied to the service, the API, and/or the one or more operations of the service. Additionally, if the onboarding service determines that the API configuration modification was not applied based on the validation report, the onboarding service can deactivate the service, the API, and/or a set of the one or more operations. Further, the deactivated service, API, and/or set of operations can be flagged for administrative review to identify an error associated with the service and/or the API.

Figure 7:
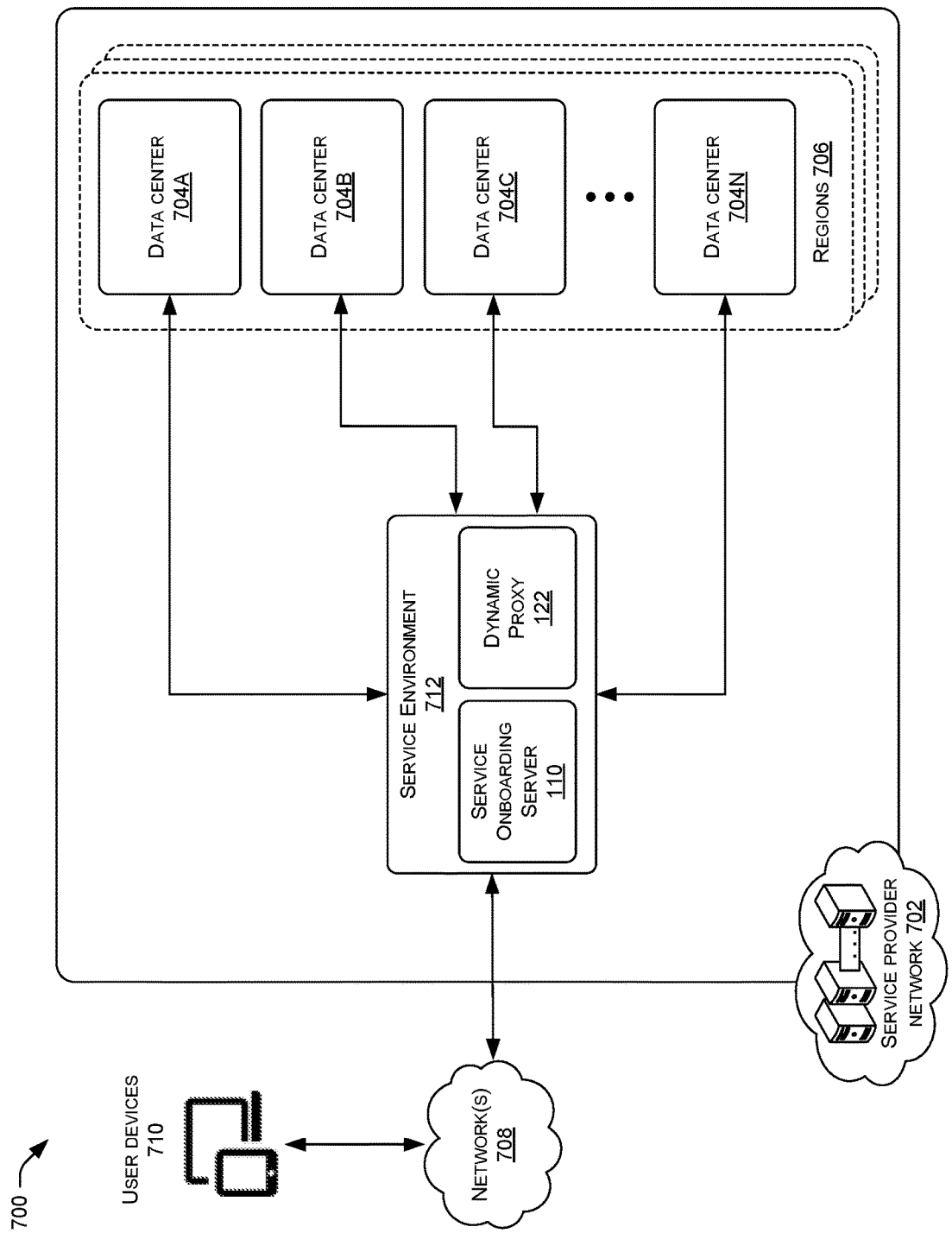
FIG. 7 illustrates a system(s) and network diagram that shows an operating environment that includes a service provider network, wherein the service provider network can include a service onboarding service, one or more service environments and a proxy server.

FIG. 7 is a system(s) and network diagram that shows an illustrative operating environment 700 that includes a service provider network 702, wherein the service provider network 702 can include the service onboarding server 110 for integrating services and APIs into the service provider network 702. Additionally, the service provider network 702 can include a dynamic proxy server that enables the services and the APIs to be isolated from entities associated with the service provider network while enabling the entities to access the services and the APIs. The service provider network 702 may be configured to implement aspects of the functionality described herein, such as the functions of the service onboarding server 110 described with respect to FIGS. 1-6 that allows users to submit service onboarding requests, cause the service onboarding server 110 to analyze the service onboarding requests, and trigger the generation of an API configuration for the API. The service provider network 702 may provide computing resources, like virtual machine (VM) instances and storage, on a permanent or an as-needed basis. The computing resources provided by the service provider network 702 may include data processing resources, data storage resources, networking resources, data communication resources, network services, and the like. Among other types of functionality, the computing resources provided by the service provider network 702 may be utilized to implement the various services and components described above.

Each type of computing resource provided by the service provider network 702 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 702 may also be configured to provide other types of computing resources not mentioned specifically herein.

The computing resources provided by the service provider network 702 may be enabled in one embodiment by one or more data centers 704A-704N (which might be referred to herein singularly as "a data center 804" or in the plural as "the data centers 704"). The data centers 704 are facilities utilized to house and operate computer systems and associated components. The data centers 704 typically include redundant and backup power, communications, cooling, and security systems. The data centers 704 may also be located in geographically disparate locations, or regions 706. One illustrative embodiment for a data center 704 that may be utilized to implement the technologies disclosed herein will be described below with regard to FIG. 8.

The customer services that transmit API calls for that cause one or more operations to execute and modification requests to be registered with the service provider network 702 may transmit the API calls and the modification requests via the dynamic proxy server 122 to the onboarding queue 102. Additionally, the dynamic proxy server 122 may access the computing resources provided by the service provider network 702 over any wired and/or wireless network(s) 708, which may be a wide area communication network ("WAN"), such as the Internet, an intranet or an Internet service provider ("ISP") network or a combination of such networks 708. For example, and without limitation, user devices 710 can be operated by the users to transmit user requests to the service provider network 702, or computing resources thereof, by way of the network(s). It should be appreciated that a local-area network ("LAN"), the Internet, or any other networking topology known in the art that connects the data centers 704 to remote clients and other users may be utilized. It should also be appreciated that combinations of such networks may also be utilized. The service onboarding server 110 offered as a service by the service provider network 702 may manage the deployment of computing resources of the service provider network 702 when generating and managing certificate authorities.

In some examples, the service environment 712 can be implemented such that the service onboarding server 110 and/or the dynamic proxy server 122 can be accessed via the service environment 712 and can access one or more additional service environments associated with the service provider network 702. In particular, the service provider network 702 can enable the service onboarding server 110 and/or the dynamic proxy server 122 to be hosted by the service environment 712 while maintaining the registration of and access to services and APIs that are registered with the one or more additional service environments and accessed via the data centers 704 and the regions 706. Additionally, the dynamic proxy server 122 can be configured such that the access endpoint for a service can be associated with a data center 704A such that the operation is executed by the data center 704A and that API calls to the operation can be routed, via the dynamic proxy server, to the data center 704A for execution substantially independently of the region 706 and/or the service environment 712 that the API calls originate from.

Figure 8:
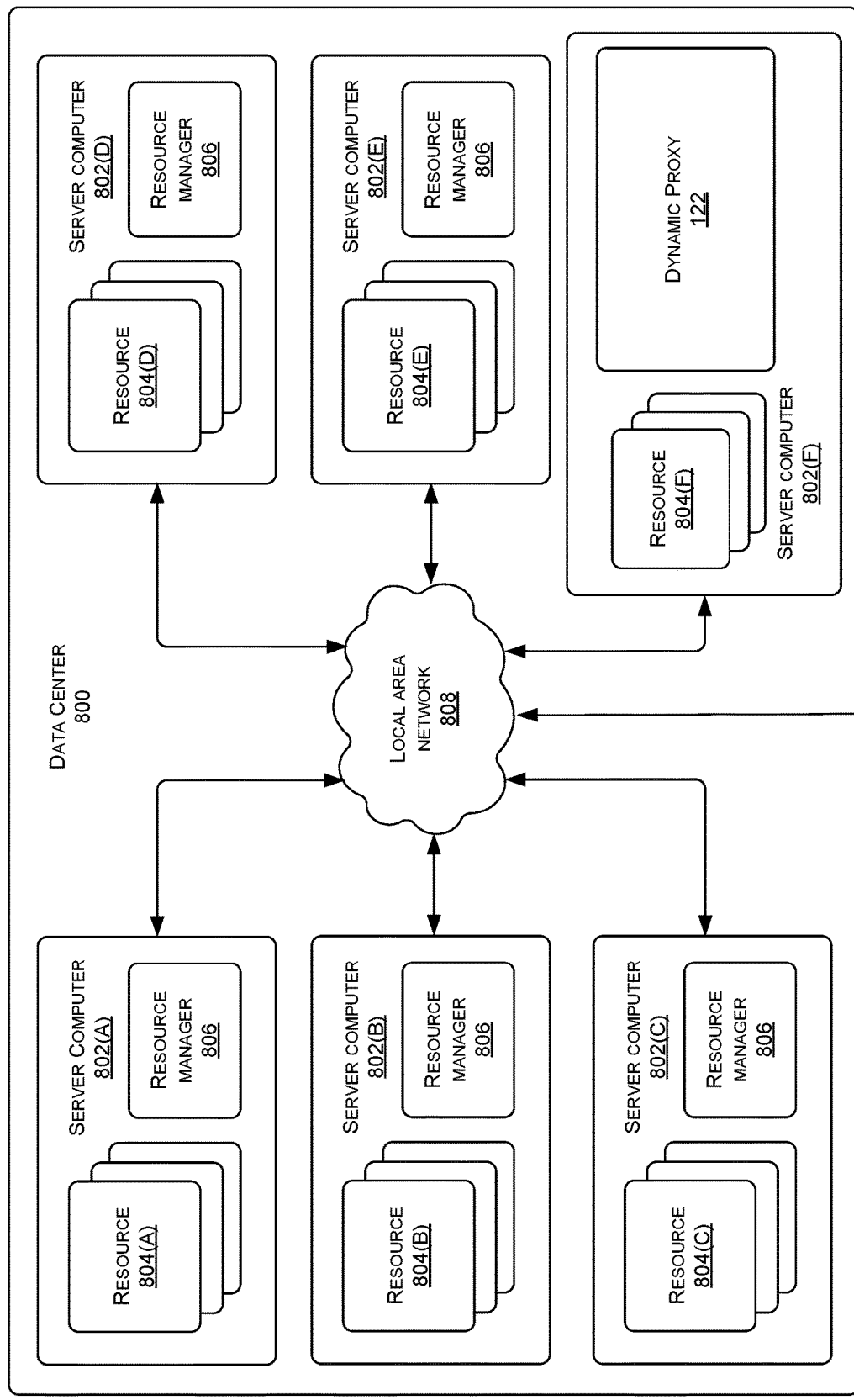
FIG. 8 illustrates a computing system diagram that illustrates one configuration for a data center that implements aspects of a dynamic proxy server that provides access to a plurality of service environments.

FIG. 8 is a computing system diagram that illustrates one configuration for a data center 800 that implements aspects of a dynamic proxy server that provides access to a plurality of service environments disclosed herein. The example data center 800 shown in FIG. 8 can include several server computers 802A-802F (which might be referred to herein singularly as "a server computer 802" or in the plural as "the server computers 802") for providing computing resources 804A-804E.

The server computers 802 may be standard tower, rackmount, or blade server computers configured appropriately for providing the computing resources described herein (illustrated in FIG. 8 as the computing resources 804A-804E). The computing resources provided by the service provider network may be data processing resources such as VM instances or hardware computing systems, database clusters, computing clusters, storage clusters, data storage resources, database resources, networking resources, and others. Some of the server computers 802 may also be configured to execute a resource manager 806 capable of instantiating and/or managing the computing resources. In the case of VM instances, for example, the resource manager 806 may be a hypervisor or another type of program configured to enable the execution of multiple VM instances on a single server computer 802. Server computers 802 in the data center 800 may also be configured to provide network services and other types of services.

In the example data center 800 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of a plurality of data centers, between each of the server computers 802A-802F in each data center 800, and, potentially, between computing resources in each of the server computers 802. It should be appreciated that the configuration of the data center 800 described with reference to FIG. 8 is merely illustrative and that other implementations may be utilized.

The data center 800 shown in FIG. 8 also includes a server computer 802F that may execute some or all of the software components described above by FIGS. 1-6. For example, and without limitation, the server computer 802F (and the other server computers 802) may generally correspond to a server/computing device configured to execute components including, without limitation, the service onboarding server 110 that processes and correlated user requests, as described herein, and/or the other software components described above. The server computer 802F may also be configured to execute other components and/or to store data for providing some or all of the functionality described herein. In this regard, it should be appreciated that the components illustrated in FIG. 8 as executing on the server computer 802F may execute on many other physical or virtual servers in the data centers 800 in various embodiments. Thus, the data center 800 in FIG. 8 may also include a plurality of server computers 802 that execute a fleet of VM instances.

Figure 9:
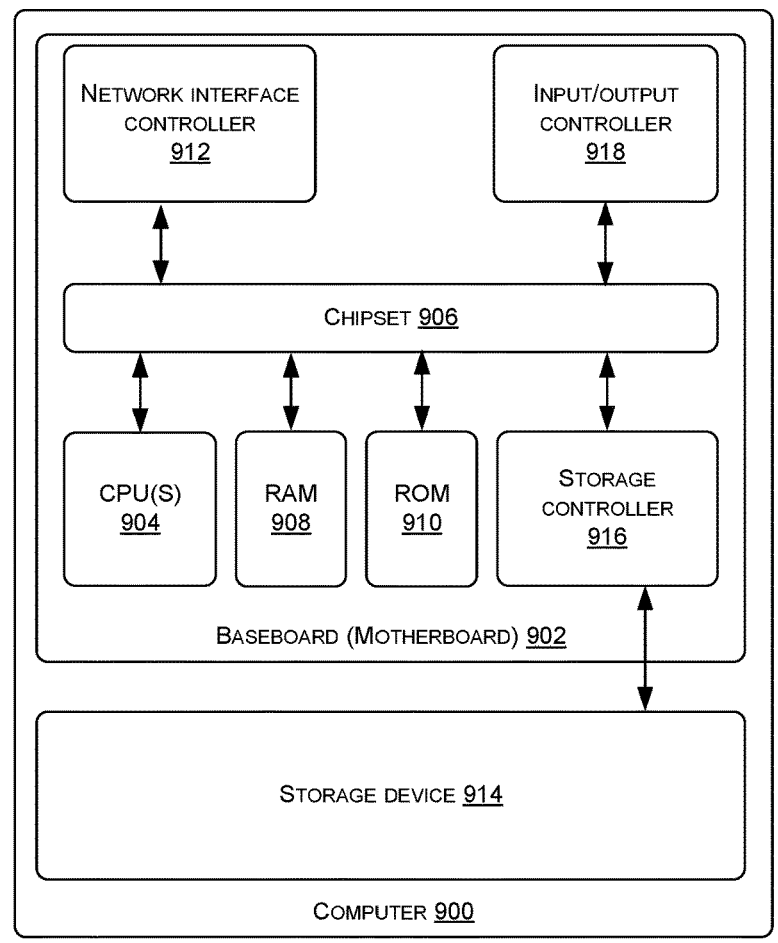
FIG. 9 illustrates an example computer architecture for a computer or a server capable of executing program components for implementing service and API implementation and modification.

FIG. 9 shows an example computer architecture for a computer 900 capable of executing program components for implementing the enhancement systems and enrichment systems described above. The computer architecture shown in FIG. 9 illustrates a server computer, workstation, desktop computer, laptop, tablet, network appliance, e-reader, smartphone, or other computing device, and may be utilized to execute any of the software components presented herein. In some examples, the computer 900 may correspond to one or more computing devices that implements the components and/or services described herein (e.g., the user devices 710, the service onboarding server 110, etc.). In some additional examples, the computer 900 may correspond the enrichment system and/or the enhancement system. In some further examples, the computer 900 can be configured to interact with or correspond to any of the systems and/or implement the methods discussed in FIGS. 1-8.

The computer 900 includes a baseboard 902, or "motherboard," which is a printed circuit board to which a multitude of components or devices may be connected by way of system(s) bus or other electrical communication paths. In one illustrative configuration, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

In some alternative examples, the CPUs 904 can be replaced and/or be configured to interact with one or more processors. It should be noted that the one or more processors can include the CPUs 904, one or more graphics processing units (GPUs), both the CPUs 904 and GPUs, and/or other processing units or components known in the art. For example, the one or more processors can include one or more processing units configured as controllers, microcontrollers, computational devices, microprocessors, and/or other computational devices configured to control and/or cause a user device to execute the operations described above.

The chipset 906 provides an interface between the CPUs 904 and the remainder of the components and devices on the baseboard 902. The chipset 906 may provide an interface to a random-access memory (RAM) 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the LAN 808. The chipset 906 may include functionality for providing network connectivity through a network interface controller (NIC) 912, such as a gigabit Ethernet adapter. The NIC 912 is capable of connecting the computer 900 to other computing devices over the LAN 808. It should be appreciated that multiple NICs 912 may be present in the computer 900, connecting the computer to other types of networks and remote computer systems. In some examples, the network interface controller can be associated with one or more transceivers that can include one or more wired or wireless transceivers. For example, the transceivers can include a network adapter, a LAN adapter, an address associated with a network connection, or another device permitting communications to be sent and received. Additionally, the one or more transceivers can comprise any wireless transceiver capable of engaging in wireless, radio frequency (RF) communication. Further, the one or more transceivers can also include other wireless modems, such as Wi-Fi, WiMAX, Bluetooth, and/or infrared communication modems.

The computer 900 may be connected to a mass storage device 914 that provides non-volatile storage for the computer 900. The mass storage device 914 may store an operating system, programs, and/or components including, without limitation, the service onboarding server 110 that processes data using data pipelines, as described herein, and data, which have been described in greater detail herein. The mass storage device 914 may be connected to the computer 900 through a storage controller 916 connected to the chipset 906. The mass storage device 914 may consist of one or more physical storage units. The storage controller 916 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 914 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 914 is characterized as primary or secondary storage, and the like.

For example, the computer 900 may store information to the mass storage device 914 by issuing instructions through the storage controller 916 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 914 by detecting the physical states or characteristics of one or more particular locations within the physical storage units.

In addition to the mass storage device 914 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900. In some examples, the operations performed by the service provider network 702, and or any components and/or services included therein, may be carried out by the processor(s).

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 914 may store an operating system utilized to control the operation of the computer 900. According to one embodiment, the operating system comprises the LINUX operating system. According to another embodiment, the operating system comprises the WINDOWS® SERVER operating system from MICROSOFT® Corporation of Redmond, Wash. According to further embodiments, the operating system may comprise the UNIX operating system or one of its variants. It should be appreciated that other operating systems may also be utilized. The mass storage device 914 may store other system or application programs and data utilized by the computer 900.

In one embodiment, the mass storage device 914 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-5. The computer 900 may also include computer-readable storage media having instructions stored thereupon for performing any of the other computer-implemented operations described herein.

The computer 900 may also include one or more input/output controllers 918 for receiving and processing input from a number of input devices, such as a keyboard, a mouse, a touchpad, a touch screen, an electronic stylus, or other type of input device. Similarly, an input/output controller 918 may provide output to a display, such as a computer monitor, a flat-panel display, a digital projector, a printer, or other type of output device. It will be appreciated that the computer 900 might not include all of the components shown in FIG. 9, may include other components that are not explicitly shown in FIG. 9, or might utilize an architecture completely different than that shown in FIG. 9.

While various examples and embodiments are described individually herein, the examples and embodiments may be combined, rearranged, and modified to arrive at other variations within the scope of this disclosure. Additionally, and although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
   one or more processors; and
   a memory storing one or more instructions that are executable by the one or more processors to perform operations comprising:
      receiving an onboarding request for a service and an application programming interface (API) associated with the service, the onboarding request including one or more modifications to the service and the API;
      determining, based on the one or more modifications, an API configuration that enables one or more operations of the service to be accessed by users, wherein the API configuration includes:
a service configuration that identifies a server configured to execute the one or more operations of the service, the one or more operations executed based on an API call received by the server;
a dimensional configuration that describes permissions for one or more categories of users to generate the API call, cause the one or more operations to executed based on the API call, and cause a proxy server to route the API call to an access endpoint of the service;
an operational configuration that includes an API call structure for the API call, wherein the API call structure indicates that the API call includes at least an operation of the one or more operations to be executed and one or more input variables for the operation;
registering, based on the API configuration, the service with the server via the proxy server such that the proxy server receives the API call from a user associated with the one or more categories of users and routes the API call to the server based on the API configuration; and
validating the one or more modifications to the service and the API via a test case, the test case configured to determine whether the API activates the service and whether the one or more operations generate a report that is based on the one or more input variables provided by the test case.

2. The system as recited in claim 1, wherein the API is configured to enable the one or more operations of the service to:
be accessed by the user based on the permissions granted to the one or more categories of users by the dimensional configuration;
be accessed by one or more additional services associated with the service; and
access one or more additional operations associated with the one or more additional services.

3. The system as recited in claim 2, the operations further comprising:
determining, based on the test case, whether the one or more operations transmitted an additional API call to the one or more additional operations via the proxy server; and
determining whether the one or more additional operations generated an additional API call response transmitted to the one or more operations via the proxy server.

4. The system as recited in claim 2, the operations further comprising executing the test case by:
transmitting, via the proxy server, an additional API call to the one or more additional services;
determining that the one or more additional services transmitted the API call to the one or more operations; and
determining that the report was generated by the one or more operations and transmitted to the one or more additional services via an API call response.

5. The system as recited in claim 1, wherein determining the API configuration further comprises:
determining, based on the service and the API, whether the service is an existing service and whether the API is an existing API;
determining, based on a determination that the service is the existing service, that the one or more modifications are to replace one or more API structures within the existing API; and
generating, based on the one or more modifications, an updated API that is registered with the proxy server to replace the existing API.

6. A system comprising:
one or more processors; and
a memory storing one or more instructions that are executable by the one or more processors to perform operations comprising:
receiving a request that is associated with a service, within a service environment, and an application programming interface (API) of the service, the request including one or more modifications;
determining, based at least in part on the one or more modifications, an API configuration associated with the service, wherein the API configuration includes:
an access endpoint within the service environment that is associated with the service;
one or more permissions for the API to transmit an API call from a plurality of service environments and one or more user categories to the access endpoint; and
an API call structure for the API call that causes an operation of the service to be executed at the access endpoint;
registering, based at least in part on the API configuration, the access endpoint, the one or more permissions, and the API call structure with a proxy server, the proxy server configured to route one or more API calls associated the service to the access endpoint; and
validating the one or more modifications and the API based at least in part on a test case configured to transmit the one or more API calls and execution of the operation.

7. The system as recited in claim 6, wherein the API is configured to:
enable a user associated the one or more user categories and one or more additional services to access the operation via proxy server; and
enable the operation to transmit an additional API call to one or more additional operations associated with the one or more additional services via the proxy server.

8. The system as recited in claim 6, wherein validating the one or more modifications further comprises:
transmitting, via the proxy server, the one or more API calls configured to submit permission requests for the one or more user categories from the plurality of service environments;
determining, based at least in part on one or more API call responses, that the service executed the operation for one or more permitted API calls and blocked one or more denied API calls; and
determining that the one or more permitted API calls:
caused the operation to generate an output variable; and
caused the service to transmit the one or more API call responses associated with the one or more permitted API calls to the test case.

9. The system as recited in claim 6, wherein validating the one or more modifications further comprises:
receiving, at the proxy server, a set of API calls configured to access the operation from one or more additional services associated with one or more additional service environments;

determining, based at least in part on the one or more permissions, whether the set of API calls is permitted to be routed to the access endpoint; and causing the proxy server to transmit one or more permitted API calls to the access endpoint.

10. The system as recited in claim 6, wherein registering the API further comprises:

generating, based at least in part on the API configuration, API access information and API operations information, the API access information configured to identify one or more API calls associated with the service and the API operations information configured to identify one or more API call structures and one or more input variables associated with the operation.

11. The system as recited in claim 10, wherein the API access information and the API operations information are stored within a service lookup database that enables the service and one or more additional services associated with the service environment to be identified.

12. The system as recited in claim 6, wherein the proxy server is configured to separate the API from the service, the proxy server further configured to enable:

the one or more modifications to replace the API with an updated API and the proxy server is configured to transmit incoming API calls to the service according to the updated API; and the service to be accessible across the plurality of service environments and for the access endpoint to receive the API call independent of a source service environment of the API call.

13. One or more non-transitory computer-readable media storing computer-executable instructions that, when executed by one or more processors, cause the one or more processors to perform operations comprising:

receiving a request that is associated with a service, within a service environment, and an application programming interface (API) of the service, the request including one or more modifications;

determining, based at least in part on the one or more modifications, an API configuration associated with the service, wherein the API configuration includes:
  an access endpoint within the service environment that is associated with the service;
  one or more permissions for the API to transmit an API call from a plurality of service environments and one or more user categories to the access endpoint; and
  an API call structure for the API call that causes an operation of the service to be executed at the access endpoint;

registering, based at least in part on the API configuration, the access endpoint, the one or more permissions, and the API call structure with a proxy server, the proxy server configured to route one or more API calls associated the service to the access endpoint; and validating the one or more modifications and the API based at least in part on a test case configured to transmit the one or more API calls and execution of the operation.

14. The one or more non-transitory computer-readable media as recited in claim wherein the API is configured to:

enable a user associated the one or more user categories and one or more additional services to access the operation via proxy server; and enable the operation to transmit an additional API call to one or more additional operations associated with the one or more additional services via the proxy server.

15. The one or more non-transitory computer-readable media as recited in claim 13, wherein validating the one or more modifications further comprises:

transmitting, via the proxy server, the one or more API calls configured to submit permission requests for the one or more user categories from the plurality of service environments;

determining, based at least in part on one or more API call responses, that the service executed the operation for one or more permitted API calls and blocked one or more denied API calls; and determining that the one or more permitted API calls:
caused the operation to generate an output variable; and
caused the service to transmit the one or more API call responses associated with the one or more permitted API calls to the test case.

16. The one or more non-transitory computer-readable media as recited in claim 13, wherein validating the one or more modifications further comprises:

receiving, at the proxy server, a set of API calls configured to access the operation from one or more additional services associated with one or more additional service environments;

determining, based at least in part on the one or more permissions, whether the set of API calls is permitted to be routed to the access endpoint; and causing the proxy server to transmit one or more permitted API calls to the access endpoint.

17. The one or more non-transitory computer-readable media as recited in claim 13, wherein registering the API further comprises:

generating, based at least in part on the API configuration, API access information and API operations information, the API access information configured to identify one or more API calls associated with the service and the API operations information configured to identify one or more API call structures and one or more input variables associated with the operation.

18. The one or more non-transitory computer-readable media as recited in claim 17, wherein the API access information and the API operations information are stored within a service lookup database that enables the service and one or more additional services associated with the service environment to be identified.

19. The one or more non-transitory computer-readable media as recited in claim 13, wherein the proxy server is configured to separate the API from the service, the proxy server further configured to enable:

the one or more modifications to replace the API with an updated API and the proxy server is configured to transmit incoming API calls to the service according to the updated API; and the service to be accessible across the plurality of service environments and for the access endpoint to receive the API call independent of a source service environment of the API call.

* * * * *